Jan. 26, 1932. O. L. FALK 1,842,903
WEED EXTERMINATOR
Filed Feb. 20, 1928
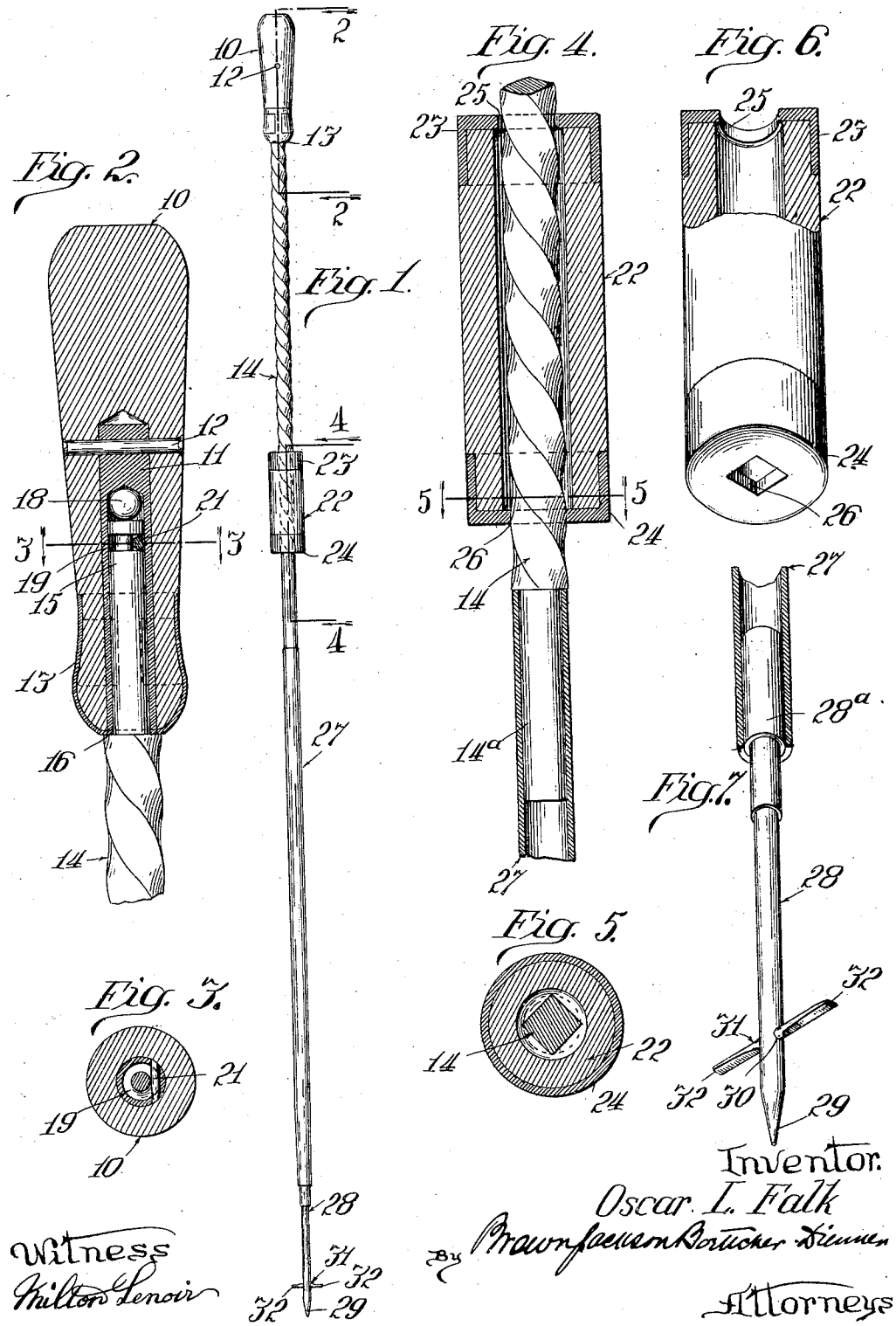
Inventor.
Oscar L. Falk Patented Jan. 26, 1932

1,842,903

UNITED STATES PATENT OFFICE

OSCAR L. FALK, OF MAYWOOD, ILLINOIS

WEED EXTERMINATOR

Application filed February 20, 1928. Serial No. 255,675.

My invention relates to devices for destroying weeds, and is particularly designed for use in destroying dandelions and other weeds in lawns and grass plots.

One of the main objects of my invention is to provide a device of this type which is of simple and inexpensive construction, easy to operate, and cannot readily get out of order. An advantage of my device is that it can be used on a lawn without disfiguring it, as it does not remove or injure the turf, and cuts off the dandelion or other root deep in the ground. Another advantage is that the operator can stand upright while using the device.

In the drawings,—

Fig. 1 is a view in elevation of my improved device;

Fig. 2 is an enlarged sectional view taken on the line 2—2 of Fig. 1;

Fig. 3 is a section taken on the line 3—3 of Fig. 2;

Fig. 4 is an enlarged sectional view taken on the line 4—4 of Fig. 1;

Fig. 5 is a section taken on the line 5—5 of Fig. 4;

Fig. 6 is a perspective view, partly in section, of the slide for rotating the tool; and Fig. 7 is an enlarged perspective view, partly in section, of the lower end portion of the device.

Referring to the several figures of the drawings, 10 indicates a handle provided at the upper end of the tool. This handle is preferably made of wood but may be of any other suitable material. Handle 10 receives a bearing sleeve 11 suitably secured therein, as by means of a pin 12, this sleeve being closed at its upper end as illustrated in Fig. 2. A ferrule 13 is secured about the lower end of the handle.

The sleeve 11 receives a reduced shank 15 at the upper end of a screw shaft 14. This shaft is formed square in cross-section and is then twisted about its axis. Shank 15 is provided with a circumferential groove 19 which receives a pin 21 secured in sleeve 11. This prevents relative axial movement between the sleeve and the shank while permitting the shank to rotate freely in the sleeve in either direction. A bearing ball 18 is confined between the upper end of sleeve 11 and the shank, this ball providing an anti-friction and thrust bearing. A shoulder 16, formed at the upper end of screw shaft 14 by the provision of the reduced shank 15, is disposed closely adjacent the lower end of ferrule 13 and coacts therewith to brace the shaft against lateral or radial stresses.

Mounted about the shaft 14 is a device for rotating said shaft with respect to the handle 10. This rotating device is in the form of a sleeve forming a slide 22. This slide is preferably made of wood, but any other suitable material may be used. Secured to the upper and lower ends of the slide 22 are metal ferrules 23 and 24, respectively, the ferrule 23 being provided with a circular opening 25, as shown in Fig. 6, of such diameter that the shaft 14 readily rotates therein. The lower ferrule 24, however, is provided with a square opening 26 (Fig. 5), corresponding to the cross-section of shaft 14. When relative longitudinal movement is imparted to slide 22 and shaft 14, the sleeve being held against rotation, the shaft is rotated due to engagement of the threads thereof in the corners of opening 26.

Shaft 14 is provided at its lower end with a reduced shank 14$^a$ fitting into a tubular rod 27 which is suitably secured upon the shank, as by being shrunk thereon (see Fig. 4). The lower end of the tubular rod 27 receives the upper enlarged portion 28$^a$ of a solid member 28 provided with a point 29 at its lower end adapted to be inserted into the ground adjacent a dandelion or other weed root. The tubular rod 27 is secured to portion 28$^a$ of member 28 in any suitable manner, as by being shrunk thereon. A short distance above the point 29 a hole 30 is drilled through member 28, and a small rod 31 is driven therethrough so that it projects radially of member 28, as shown in Fig. 7, and the ends of the rod 31 are ground down to provide knife-like cutting elements 32 for severing the root of the dandelion or other weed plant when the rod 28 is rotated, the cutting edges of these elements being in a horizontal plane. The arms of rod 31, being relatively narrow, will readily enter the ground.

In assembling the device, the shaft 14 is first inserted in slide 22 and the ball 18 is placed in sleeve 11, after which shank 15 is inserted into the sleeve and the pin 21 is inserted through the sleeve and slot 19. The handle 10 is then placed over sleeve 11 and permanently secured thereto by pin 12.

In using the device, member 28 is inserted into the ground adjacent a dandelion or other weed by pressing downward on the handle 10. The operator then moves the slide 22 along shaft 14, which is thus rotated, and the arms 32 of cutting member 31 sever the root of the dandelion below the ground surface, after which the member 28 may be withdrawn without disturbing the turf. The dandelion or other weed, the root of which has been severed, may be left in the ground and, after wilting, these weeds can be raked into piles and removed. This avoids defacing the lawn or grass plot, and provides efficient means for quickly eradicating dandelions and other weeds.

What I claim is:

1. In a device of the character described, a rod adapted at one end for insertion into the ground, a substantially flat and relatively narrow cutting member secured to the rod adjacent said end thereof and substantially at right angles to the rod, the outer end of the cutting member being provided with a substantially straight cutting edge disposed substantially at right angles to the rod, and means for rotating the rod.

2. In a device of the character described, a screw shaft, an operating member movable along the shaft and cooperating therewith for rotating said shaft, a tubular rod, the shaft having a reduced element at its lower end fitting into the upper end of the rod and secured thereto, a ground penetrating member having its upper end fitting into the lower end of the rod and secured therein, the lower end of said member being pointed for insertion into the ground, and a cutting member projecting radially from said penetrating member, said cutting member being straight and relatively narrow and flat for ease of insertion into the ground, the cutting member being disposed in a plane extending radially of the penetrating member.

3. In a device of the character described, a rod adapted at one end for insertion into the ground, and a relatively narrow cutting member extending from the rod and disposed substantially at right angles thereto both transversely and longitudinally.

4. In a device of the character described, a rod adapted at one end for insertion into the ground and a cutting member secured through the rod diametrically and adjacent said end thereof, the cutting member projecting beyond the opposite sides of the rod and being shaped to provide relatively narrow cutting elements extending from the rod and disposed substantially at right angles thereto both transversely and longitudinally.

OSCAR L. FALK.